C. S. COOK & H. H. RUDD.
TRANSFORMER HEAT REGULATING SYSTEM.
APPLICATION FILED JAN. 24, 1914.
1,254,002.
Patented Jan. 15, 1918.
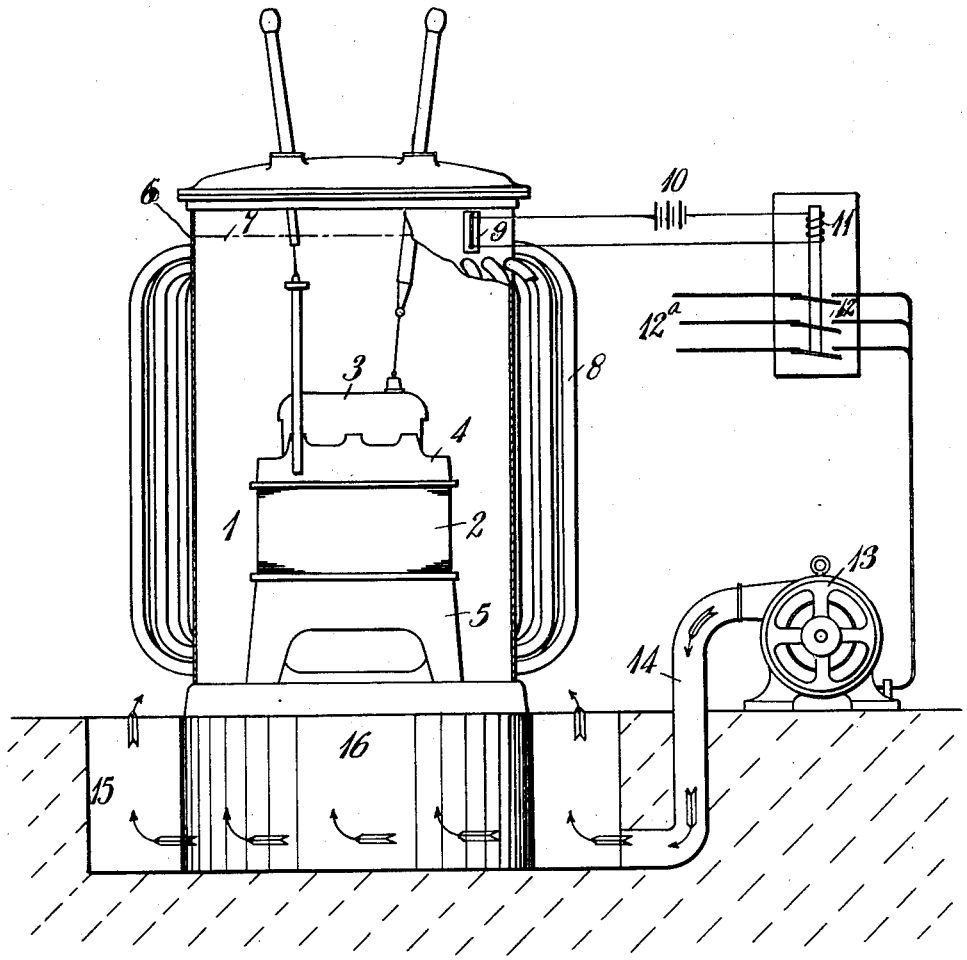
WITNESSES:
INVENTORS
Charles S. Cook
& Harold H. Rudd
BY
Wesley G. Carr
ATTORNEY

UNITED STATES PATENT OFFICE.

CHARLES S. COOK, OF PITTSBURGH, AND HAROLD H. RUDD, OF EDGEWOOD, PENNSYLVANIA, ASSIGNORS TO WESTINGHOUSE ELECTRIC AND MANUFACTURING COMPANY, A CORPORATION OF PENNSYLVANIA.

TRANSFORMER HEAT-REGULATING SYSTEM.

1,254,002.  Specification of Letters Patent.  Patented Jan. 15, 1918.

Application filed January 24, 1914. Serial No. 814,079.

*To all whom it may concern:*

Be it known that we, CHARLES S. COOK, a citizen of the United States, and a resident of Pittsburgh, in the county of Allegheny and State of Pennsylvania, and HAROLD H. RUDD, a citizen of the United States, and a resident of Edgewood, in the county of Allegheny and State of Pennsylvania, have invented a new and useful Improvement in Transformer Heat-Regulating Systems, of which the following is a specification.

Our invention relates to cooling means for electrical apparatus, and has particular reference to cooling systems for electrical power transformers of large capacity.

In power installations, it is advantageous to have the apparatus comprising the same, of a simple construction which will require very little attention on the part of the powerhouse operators. Power transformers are sometimes provided with cooling coils that are inclosed in their casings and are supplied with cold water which circulates through them to maintain the transformer temperatures at safe values by the absorption of large quantities of the generated heat. Cooling coils have disadvantages, which make it desirable to provide power transformers that are self cooled in order to preclude the admission of water into the insulating oil in which the transformers are immersed. A self cooling transformer of a common type comprises a casing containing oil, the upper and lower portions of the casing being in communication by means of a plurality of exteriorly and longitudinally extending tubes. Under normal operating conditions, this type of transformer is entirely adequate to dissipate the generated heat, but, when subjected to a heavy overload, as, for instance, during the time of maximum peak load, the transformer may not dissipate heat at a sufficiently high rate to preclude a dangerous temperature rise. Because the time of maximum peak load is usually of short duration, it would be expensive and inefficient to continually supply additional means for increasing the rate of heat dissipation from the transformer above its normal rate.

In view of the inadequacy of a self-cooling transformer to dissipate the generated heat at a sufficiently high rate, when operating under severe load conditions, we provide a system which will operate automatically to accelerate the heat-dissipating capacity of the transformer. At the same time, the normal self-radiating capacity of the transformer is maintained unaffected, so that access to the transformer may be conveniently had at all times. The additional cooling means which we employ will operate only during the time that the temperature of, or the load upon, the transformer exceeds a certain predetermined value above which it would be dangerous to continue the operation of the transformer.

For a better understanding of the nature and scope of our invention, reference may be had to the following description and the accompanying drawing in the single figure of which is illustrated, partially in elevation, partially in section and partially diagrammatically, a self-cooling transformer equipped with additional cooling means to operate when certain predetermined conditions obtain within the transformer.

A transformer 1 comprising a core 2, coils 3, and top and bottom end frames 4 and 5, respectively, is immersed in an inclosing casing or tank 6 which may be filled with oil to a level indicated at 7. A plurality of heat radiators or longitudinally extending tubes 8, that communicate with the top and the bottom portions of the transformer casing 6, constitute means for creating a defined circulation of the oil during the operation of the transformer. Under normal operating conditions, it has been found that the above described circulation of oil is entirely adequate to dissipate the heat generated by the transformer. Under abnormal operating conditions, such as exist during the period of maximum peak load, the temperature of the transformer and, consequently, of the oil, which is in intimate contact therewith, will rise. A thermostatic device 9, which responds to the temperature of the insulating oil, will close a circuit, comprising a battery 10 and a solenoid 11, when the temperature of the oil exceeds a certain predetermined value. It is usual to allow a certain temperature rise of the transformer windings under full load conditions and a somewhat greater temperature rise for 125 per cent. of full load conditions. When the temperature of the oil exceeds the maximum allowed temperature rise, the solenoid 11 is designed to actuate a switch 12, to connect a blower-operating motor to a supply circuit 12ª, the combined motor and blower being indicated at 13. The blower forces cooling air through a pipe 14 into a chamber 15 which is circumferentially disposed around the base of the transformer, as shown in the drawing. The transformer is disposed upon a base 16 which provides a substantial foundation therefor. I have found that an average pressure of three-quarters of an ounce within the annular chamber 15, as a result of the operation of the blower, is adequate to materially enhance the heat-dissipating qualities of the tubes 8.

It will be noted that I have provided no outer casing or deflectors to direct the cool air upon the pipes 8. It has been determined experimentally that, by the addition of a casing to confine the cool air in intimate contact with the tubes 8, the heat-dissipation effected by the tubes is increased only about five per cent. above that which is secured without such casing. The advantage of the structure shown in the drawing when the blower is not operating and the transformer is being cooled sufficiently by reason of the circulation of the oil only is apparent. Under normal operating conditions, an outer casing would impair the heat radiating qualities of the tubes 8 to such degree that operation of the blower continuously instead of intermittently would be necessary.

While we have shown a tubular transformer-containing case, it is obvious that any of the usual types of self-cooling tanks may be employed as, for instance, a tank having corrugated sides. Again other controlling means may be employed which will energize the blower motor when certain predetermined loads are imposed upon the main transformer. When it is desired to mount the transformers upon railway cars, as is desired in portable sub-station work, the annular chamber 15 is disposed around the lower portion of the transformer tank, as shown in the drawing, it being understood, however, that in this case, also, no outer casing is employed to entirely inclose the transformer tank.

In employing our invention, it is apparent that the transformer will, at all times, be accessible; that additional heat-dissipating facilities are provided when abnormally high load conditions obtain, and that the self-cooling means of the transformer will operate satisfactorily and unhampered under normal conditions. By means of our invention, the transformer may be located in an isolated sub-station, where no individual attention is given to it, and its ability to expeditiously dissipate the heat generated under all load conditions is insured.

While many modifications of our invention may be made, it will be understood that the invention is not limited to the specific embodiment disclosed, and we desire that only such limitations shall be imposed as are indicated in the appended claims.

We claim as our invention:

1. The combination with an electrical apparatus, a containing case therefor provided with exteriorly disposed and self-operating heat radiators which are directly exposed to the outer air, of a chamber disposed below the heat radiators and in free communication with the outer air, and means controlled by conditions obtaining in said electrical apparatus to increase the pressure obtaining within said chamber, whereby cooling air currents may be directed upon said heat radiators.

2. The combination with an electrical apparatus, a containing case therefor provided with exteriorly disposed and self-operative heat radiators which are directly exposed to the outer air, of a chamber disposed below the heat radiators and in free communication with the outer air, and means to increase the pressure obtaining within said chamber in order to direct cooling air currents upon said heat radiators, said means being operative only during the time that the temperature of said electrical apparatus exceeds a predetermined value.

In testimony whereof, we have hereunto subscribed our names this 14th day of Jan., 1914.

CHARLES S. COOK.
HAROLD H. RUDD.

Witnesses:
H. W. COPE,
B. B. HINES.